United States Patent
Tumbde et al.

(10) Patent No.: US 11,947,894 B2
(45) Date of Patent: Apr. 2, 2024

(54) CONTEXTUAL REAL-TIME CONTENT HIGHLIGHTING ON SHARED SCREENS

(71) Applicant: INTERNATIONAL BUSINESS MACHINES CORPORATION, Armonk, NY (US)

(72) Inventors: Manish Madhukarrao Tumbde, Pune (IN); Mandar Dattatraya Bhuvad, Pune (IN); Nitesh Jankilal Shreemali, Pune (IN); Girish Padmanabhan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 17/242,684

(22) Filed: Apr. 28, 2021

(65) Prior Publication Data
US 2022/0350954 A1 Nov. 3, 2022

(51) Int. Cl.
*G06F 40/109* (2020.01)
*G06F 40/284* (2020.01)
*G06F 40/35* (2020.01)
*G06V 20/00* (2022.01)
*G10L 15/18* (2013.01)
*G10L 15/22* (2006.01)

(52) U.S. Cl.
CPC .......... *G06F 40/109* (2020.01); *G06F 40/284* (2020.01); *G06F 40/35* (2020.01); *G06V 20/00* (2022.01); *G10L 15/1815* (2013.01); *G10L 15/22* (2013.01)

(58) Field of Classification Search
CPC ............... G10L 15/183; G10L 15/063; G10L 2015/0635; G10L 15/1822; G06F 40/157; G06F 40/211; G06F 40/216; G06F 40/247; G06F 40/284; G06F 40/35; G06F 16/90332; G06F 40/56
See application file for complete search history.

(56) References Cited

U.S. PATENT DOCUMENTS 7,925,993 B2  4/2011 Williams
8,117,034 B2  2/2012 Gschwendtner
(Continued)

FOREIGN PATENT DOCUMENTS

CN   107066464 A * 8/2017 ........... G06F 16/583

OTHER PUBLICATIONS

Asadi, R., Trinh, H., Fell, H. J., & Bickmore, T. W. (Mar. 2018). Quester: A Speech-Based Question Answering Support System for Oral Presentations. In 23rd International Conference on Intelligent User Interfaces (pp. 583-593). (Year: 2018).*
(Continued)

*Primary Examiner* — Bhavesh M Mehta
*Assistant Examiner* — Philip H Lam
(74) *Attorney, Agent, or Firm* — Lily Neff

(57) ABSTRACT

A method, computer system, and a computer program product for contextual digital content highlighting is provided. Discussion is monitored between a plurality of parties in conjunction with a digital presentation and a context of the monitored discussion is then identified. Then a most relevant portion of displayed digital content associated with the presentation is identified based on the identified context and highlighting then is applied to the identified most relevant portion of the displayed content.

17 Claims, 8 Drawing Sheets

(56) References Cited

U.S. PATENT DOCUMENTS

| | | | | |
|---|---|---|---|---|
| 8,990,235 | B2 | 3/2015 | King | |
| 10,440,325 | B1 | 10/2019 | Boxwell | |
| 10,827,023 | B1* | 11/2020 | Yan | H04L 67/535 |
| 2007/0234209 | A1* | 10/2007 | Williams | G06F 3/04842 |
| | | | | 715/767 |
| 2011/0043652 | A1* | 2/2011 | King | G06F 40/194 |
| | | | | 707/706 |
| 2011/0213655 | A1* | 9/2011 | Henkin | G06Q 30/00 |
| | | | | 707/E17.061 |
| 2013/0212490 | A1* | 8/2013 | Scherpa | G06Q 10/101 |
| | | | | 715/753 |
| 2013/0311177 | A1* | 11/2013 | Bastide | H04N 7/15 |
| | | | | 704/235 |
| 2016/0234223 | A1* | 8/2016 | Clark | G06F 16/35 |
| 2019/0005024 | A1* | 1/2019 | Somech | G06F 16/243 |
| 2020/0193153 | A1* | 6/2020 | Lee | G06V 30/418 |
| 2020/0403817 | A1* | 12/2020 | Daredia | G06F 16/345 |
| 2021/0006660 | A1* | 1/2021 | Adibi | H04L 67/565 |
| 2021/0056860 | A1* | 2/2021 | Fahrendorff | G06Q 10/10 |

OTHER PUBLICATIONS

Disclosed Anonymously, "Technique for content based alerts in multi-person group chat discussions," IP.com No. IPCOM000240056D, IP.com Publication Date: Dec. 29, 2014, 4 pages.

Disclosed Anonymously, "Anticipatory cursor placement based on extrapolation of current cursor direction, past hot button choices and eye or head movement/trajectory," IP.com No. IPCOM000215885D, IP.com Publication Date: Mar. 14, 2012, 5 pages.

Disclosed Anonymously, "Method and System for Identifying and Communicating Non-Verbal Interactions in a Video Conference," IP.com No. IPCOM000257669D, IP.com Publication Date: Feb. 28, 2019, 5 pages.

Disclosed Anonymously, "System and method of interests based web conference interaction," IP.com No. IPCOM000251808D, IP.com Publication Date: Dec. 5, 2017, 7 pages.

Kojiri et al., "Effective Presentation Speech Support System for Representing Emphasis-Intention," Systems 2016, 4, 1; doi: 10.3390/systems4010001, Published 23, Dec. 2015, 9 pages.

Mell et al., "The NIST Definition of Cloud Computing", Recommendations of the National Institute of Standards and Technology, NIST Special Publication 800-145, Sep. 2011, 7 pages.

* cited by examiner

CONTEXTUAL REAL-TIME CONTENT HIGHLIGHTING ON SHARED SCREENS

BACKGROUND

The present invention relates generally to the field of computing, and more particularly to dynamic intelligent interface manipulation.

Electronic meetings and presentations are now used with increasing frequency. During these meetings a common scenario occurs when a specific topic is discussed between two or more parties related to content displayed on a screen. In these situations, context identification from the discussion that is relevant to the presentation content may ensure that the focus of the presentation or discussion shifts back to the relevant content of the presentation.

SUMMARY

According to one exemplary embodiment, a method for contextual digital content highlighting is provided. Discussion is monitored between a plurality of parties in conjunction with a digital presentation and a context of the monitored discussion is then identified. Then a most relevant portion of displayed digital content associated with the presentation is identified based on the identified context and highlighting then is applied to the identified most relevant portion of the displayed content. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
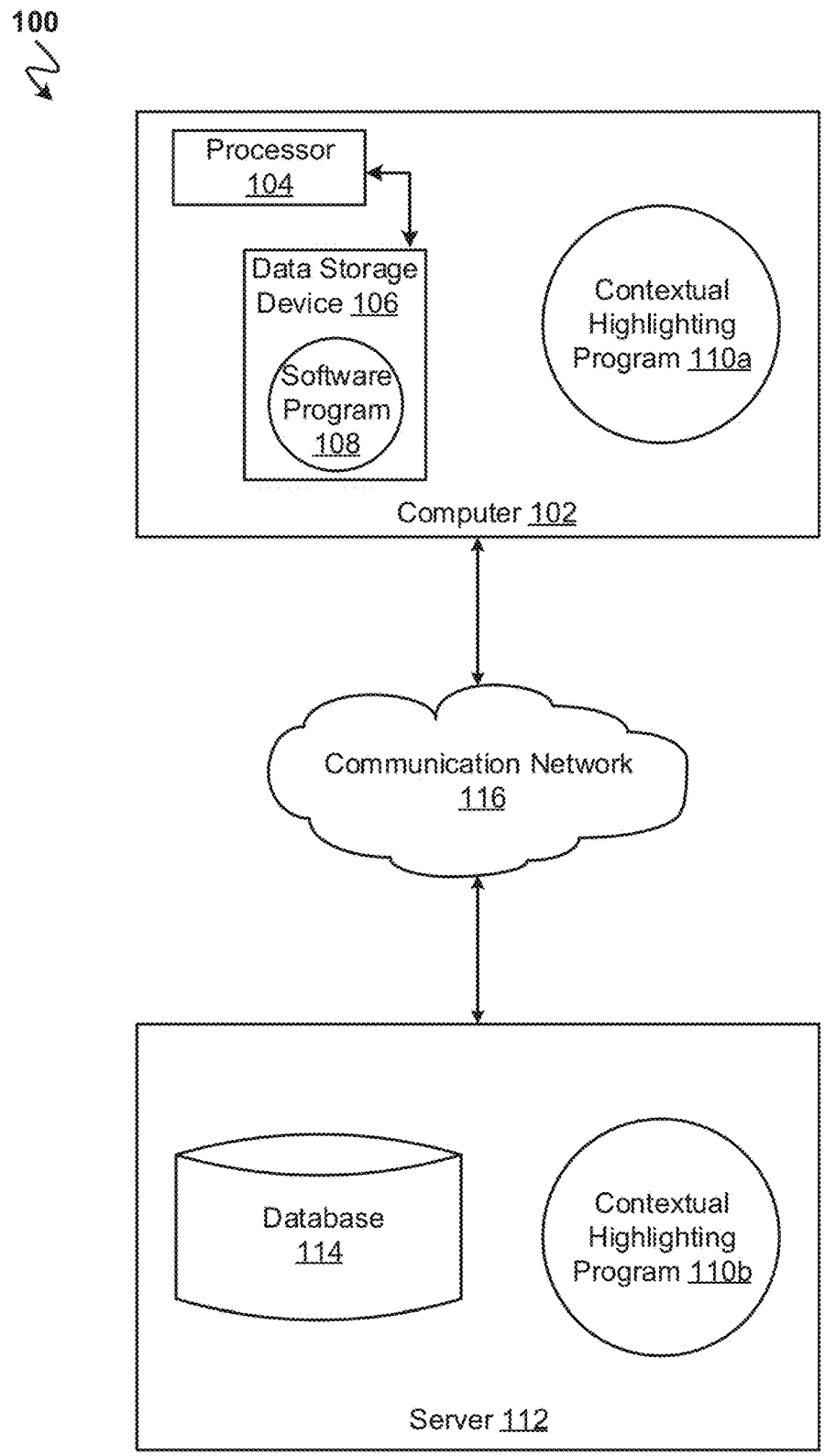
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described above, electronic meetings and presentations are now used with increasing frequency. During these meetings a common scenario occurs when a specific topic is discussed between two or more parties related to content displayed on a screen. In these situations, context identification from the discussion that is relevant to the presentation content may ensure that the focus of the presentation or discussion shifts back to the relevant content of the presentation.

Therefore, it may be advantageous to, among other things, provide a way to highlight or otherwise indicate in real-time which portion of content displayed during a presentation relates to the current discussion such that participants may quickly ascertain the relevant portion of the displayed content. It may be further advantageous to, in some embodiments, validate information in real-time that is displayed and relevant to the current discussion, and convey the validity to the participants in order to more quickly resolve tangential discussions, thereby allowing the meeting or presentation to proceed.

The following described exemplary embodiments provide a system, method and program product for real-time contextual cursor highlighting of displayed content. As such, the present embodiment has the capacity to improve the technical field of user interfaces by intelligently highlighting relevant content in real-time based on ongoing interactions. More specifically, the current topic of discussion between two or more parties is determined and compared with the content that is displayed currently. Displayed content within the greatest similarity to the current discussion topic is then identified. The identified content within the displayed content is then highlighted. According to some embodiments, the validity of the identified content may also be determined and the resulting validity may be indicated via on-screen identifier.

Reference is made with respect to certain embodiments in the context of virtual meetings. Virtual meetings as used herein refers to meetings of two or persons (i.e., participants or attendees) online through digital means instead of traditional physical meetings where the participants meet face-to-face in the same room. Virtual meetings may include digital transmission of data over a network between computers or other electronic devices including audio, video, text, images, and so on, such that the participants may experience and interact during a presentation or meeting similar to a traditional physical meeting. The term virtual meeting may be used interchangeably with online meeting, electronic meeting, or video conferencing.

As used herein, presentation software refers to software, applications, other executable code which causes an electronic device, such as a computer, to display presentations on a screen. For instance, a slide deck used in a presentation may be displayed on the presenter's screen using the presentation software. For example, presentation software may include PowerPoint® (PowerPoint and all PowerPoint-based trademarks and logos are trademarks or registered trademarks of the Microsoft Corporation and/or its affiliates).

As used herein, meeting software refers to software, applications, other executable code which causes an electronic device, such as a computer, to conduct a virtual meeting by sharing the screen of a meeting participant (e.g., speaker) with the rest of the meeting attendees and distribute audio, video, or other data to facilitate attendee participation in the meeting or presentation. An example of meeting software may include Webex® (Webex and all Webex-based trademarks and logos are trademarks or registered trademarks of the Cisco Systems, Inc. and/or its affiliates).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a contextual highlighting program 110a. The networked computer environment 100 may also include a server 112 that is enabled to run a contextual highlighting program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the contextual highlighting program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the contextual highlighting program 110a, 110b (respectively) to identify and highlight relevant content displayed on a shared screen in real-time based on the topic of discussion. The contextual highlighting method is explained in more detail below with respect to FIGS. 2 and 3A-C.

Figure 2:
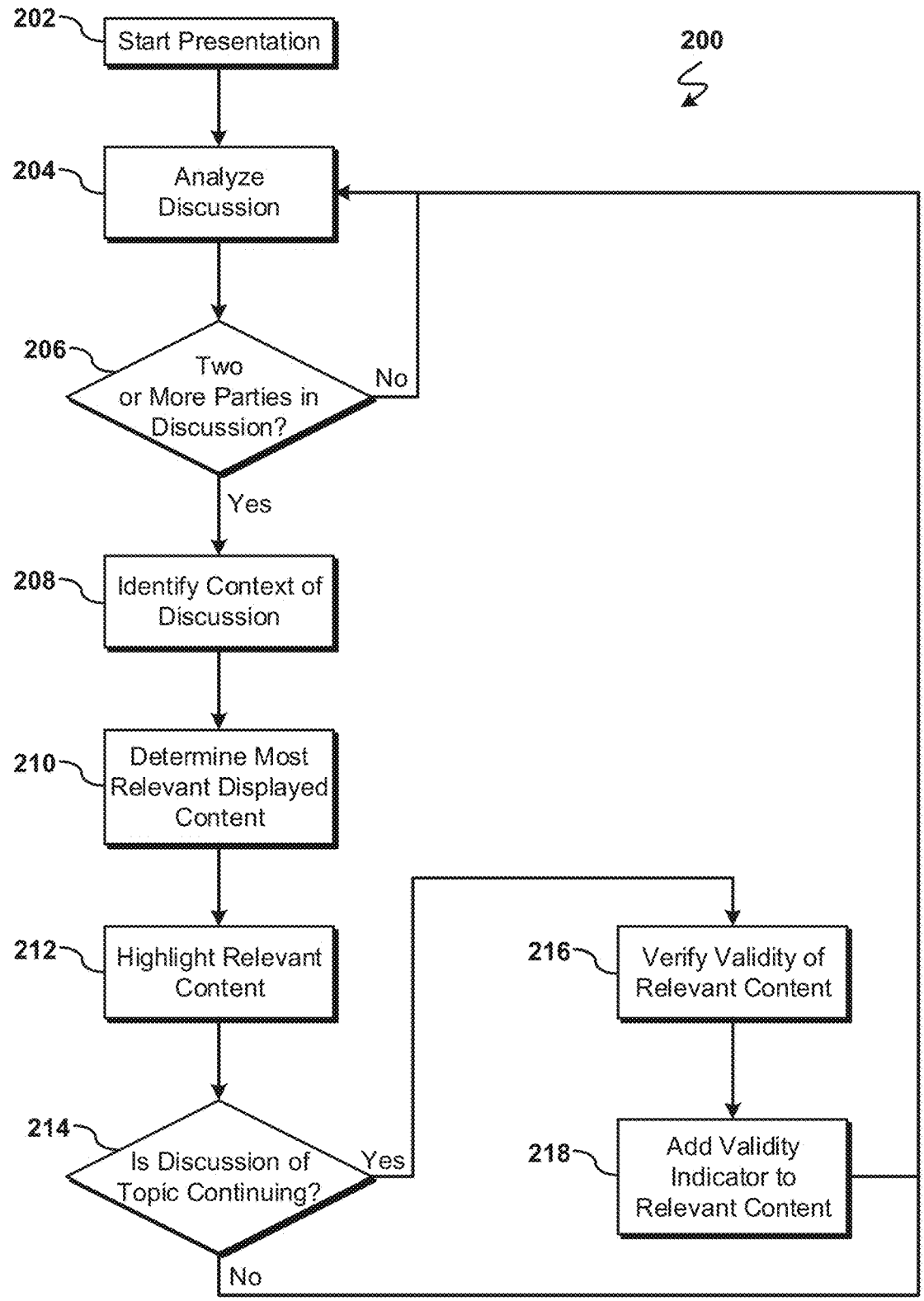
FIG. 2 is an operational flowchart illustrating a process for contextual highlighting according to at least one embodiment.

Referring now to FIG. 2, an operational flowchart illustrating the exemplary contextual highlighting process 200 used by the contextual highlighting program 110a and 110b according to at least one embodiment is depicted.

At 202 a presentation or meeting begins. The presentation, virtual meeting, or the like may include content displayed to participants or audience members. Displayed content may be presented on device screen connected to a computer 102, projected onto a screen, displayed in augmented reality devices, and so on. Displayed content may include text, tables, charts, images, video clips, audio clips, and the like related to a presentation or discussion (e.g., a work meeting). In other words, the subject matter of the displayed content is related to the topic of discussion and may be used in conjunction with the discussion.

A presenter, meeting leader, or the like may utilize presentation software (e.g., software program 108) to display content to the presentation participants. For example, a collection of ordered presentation slides may be prepared, loaded, and then displayed by the presentation software running on a computer 102 that outputs one slide at a time to a screen that may be shared with the participants. The shared screen may, for example, include a projection screen to an audience physically together in one location, or each participant may receive via a communication network 116 the content of the current slide at their individual computer 102 that displays the slide content on their individual screen in virtual meetings, or some combination thereof. Additionally, microphones, cameras, and other relevant sensors may be used to monitor the discussion occurring concurrently during the presentation or meeting. The contextual highlighting process 200 may determine the meeting has started once a trigger indicating the presentation has begun is identified. For instance, a trigger may include when the first slide is displayed to the participants or by using natural language processing (NLP) to identify predetermined phrases spoken at the start of a meeting (e.g., "Let's go ahead and begin") and obtained via a microphone.

Next, at 204, discussion during a presentation is analyzed. As described above, microphones and other sensors may be used to monitor the speech of participants. In some embodiments, vocalized speech may not be used by some or all participants and instead text messages or other non-verbal communications may be used by participants during a presentation to interact with the speaker or presenter. As such, the contextual highlighting process 200 may monitor a combination of verbal and non-verbal communication during a discussion. Verbal communications may be monitored using, for example, microphones connected to a computer 102. The audio data may be obtained from a microphone by the meeting software for transmission to the participants. In embodiments, the contextual highlighting process 200 may interface (e.g., via an application programming interface (API)) with the meeting software to obtain the audio data and process the audio data using NLP techniques. In instances when text-based discussion may occur, the contextual highlighting process 200 may interface (e.g., via an API) with the meeting software or messaging applications to obtain questions, comments, or other communication from other participants or presenters for analysis.

Then, at 206, the contextual highlighting process 200 determines if two or more parties are involved in the discussion. The parties involved in the discussion may include one or more presenters or participants. In a traditional physical meeting, determining two or more parties are involved in a discussion may include analysis of audio data captured via microphone. This analysis of audio data may use NLP techniques to identify words and phrases indicating a conversation between two parties. In some embodiments, vocal characteristics may be identified and then used by machine learning models to determine that two or more different people are speaking to each other. In virtual meeting settings, the contextual highlighting process 200 may interface with the meeting software to identify each person speaking or non-verbally communicating since the meeting software will identify the parties who are communicating based on the users signed in and the devices transmitting the signed in user's communications.

For example, in a virtual meeting discussing financial market trends, the speaker discusses the Nifty Index. A slide is displayed on a shared screen that proposes the Nifty Index will increase over the next ten days. As the speaker is making a point with respect to the Nifty Index, a participant P verbally asks a question regarding recent investment from a social media Company X in Company R and the impact of the future market capitalization of Company R. The contextual highlighting process 200 will interface with the meeting software to determine that one party is the speaker by detecting audio from the speaker's microphone and also determines that participant P is a party to the discussion by detecting audio from P's microphone.

If the contextual highlighting process 200 determined that there are not two or more parties are involved in a discussion at 206, then the contextual highlighting process 200 returns to 204 to analyze the discussion.

However, if the contextual highlighting process 200 determined that two or more parties are involved in a discussion at 206, then the context of the discussion is identified at 208. In embodiments, semantic analysis may be performed on the discussion data (e.g., audio data from a microphone) to ascertain the meaning conveyed in the current discussion. As described previously, in some instances a combination of audio data and non-verbal data may be analyzed semantically to determine the subject or topic of discussion thereby establishing the context of the discussion. In some embodiments, machine learning algorithms may be used to classify the discussion data based on topics. Other semantic analysis techniques may identify sentiments, intents, and so on. Additionally, semantic analysis may include keyword or entity extraction. After the semantic analysis is performed, additional data relating to the identified topics and keywords may be collected by searching knowledge bases, the Internet, and the like.

Continuing the previous example, the audio data from the speaker and participant P is analyzed using a supervised machine learning algorithm and the contextual highlighting process 200 receives keywords and phrases such as "Company R," "investment by Company X," and "future market capitalization" extracted by the supervised machine learning algorithm. After the keywords and phrases are extracted, the contextual highlighting process 200 searches for information related to the keywords via the Internet and determines that Company R is a part of the Nifty Index. Additionally, the contextual highlighting process 200 determines that Company X is a profitable company and that investments by profitable companies typically increases market capitalization of the investee. Moreover, the contextual highlighting process 200 determines that if Company R's market capitalization increases, the Nifty Index will be positively impacted as well since Company R is a constituent company of the Nifty.

Next, at 210, the most relevant displayed content is determined. In embodiments, the contextual highlighting process 200 may interface with the presentation software via an API to retrieve the displayed content. The displayed content may include text, images, and so on. The displayed content may be the content contained in the currently displayed slide from a presentation. In some embodiments, the displayed content may include previously displayed content. For example, a speaker may not give a participant the chance to ask a question regarding the content until the speaker has moved on to the next slide. As such, some embodiments may obtain content previously displayed. In some embodiments, the previously displayed content may be limited by a threshold amount of time since the slide was displayed (e.g., 2 minutes), a threshold number of previously displayed slides (e.g., 3 slides previous), or a percentage of the presentation previously displayed (e.g., 10% of 100 slides, thus 10 slides previous).

To determine the most relevant content from the displayed content, semantic analysis may be performed on the displayed content, similar to the semantic analysis of the discussion described above with respect to 208. Consequently, a machine learning model may be used to analyze the displayed content to identify keywords and phrases and other semantic cues. Since the displayed content may include images, tables, charts, video and other visual data, the semantic analysis may involve preliminary image analysis to generate textual representations of visual data contained within the displayed content. The textual representations of the visual data may then be grouped with the textual data from the displayed content and input into machine learning models to identify keywords or phrases. The textual data representing the displayed content may be broken down or tokenized into portions such as by sentence, clauses within a sentence, words, list items, individual images, and so on.

Once the displayed content has been semantically analyzed, a similarity algorithm may be used to compare the context of the discussion identified at 208 to the semantics of the displayed content to find the portions of the displayed content that most closely match the discussion context. Semantic similarity algorithms may output a score indicating how similar each portion of the displayed content is to the discussion context (e.g., normalized from 0 to 1 with 1 being close similarity). According to at least one embodiment, once the similarity scores are calculated for each portion of displayed content, the portions may be sorted and ranked by similarity scores. The portion having the highest similarity score may then be selected as the most relevant displayed content.

Figure 3A:
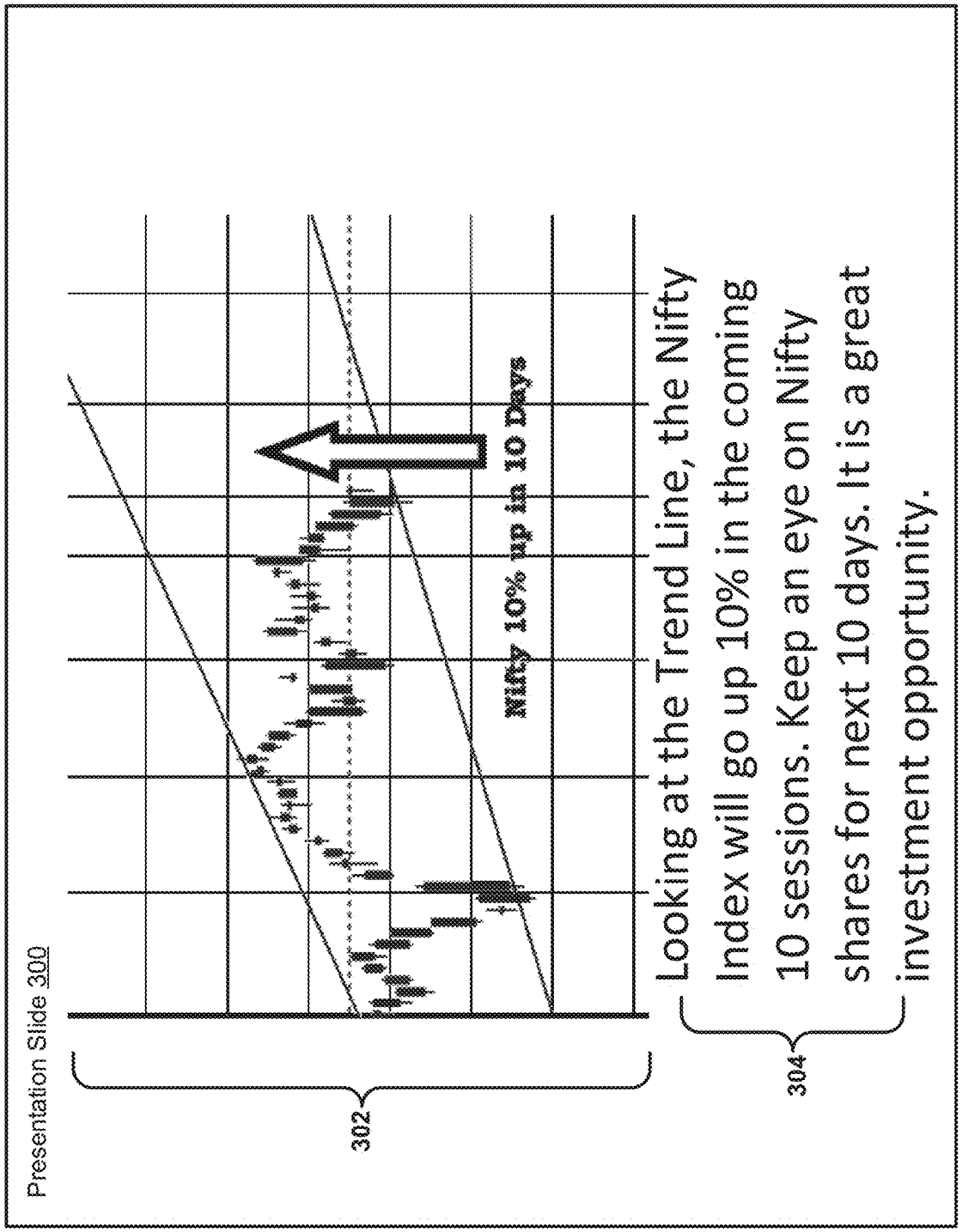
FIGS. 3A-C depict exemplary contextual highlighting applied to a presentation slide according to at least one embodiment.

Continuing the previous example, and as depicted in FIG. 3A, the displayed content in the presentation slide 300 includes a graph 302 showing the Nifty Index historical values accompanied by text 304 stating "Looking at the Trend Line, the Nifty Index will go up 10% in the coming 10 sessions. Keep an eye on Nifty shares for next 10 days. It is a great investment opportunity." The contextual highlighting process 200 may obtain the displayed content (i.e., graph 302 and text 304) from the presentation software. Thereafter, the contextual highlighting process 200 may identify visual data (i.e., graph 302) and perform image analysis to generate a textual representation of the graph 302. The text 304 may be broken down into portions based on clauses. The textual representation of the graph 302 along with the clauses from the text 304 are then semantically analyzed and compared to the discussion context identified previously. After computing similarity scores for each portion of the displayed content, the scores are ranked from highest to lowest. The portion of displayed content with the highest similarity score is the clause "Nifty Index will go up 10% in the coming 10 sessions." Thus, the clause "Nifty Index will go up 10% in the coming 10 sessions" is determined to be the most relevant portion of the displayed content.

Then, at 212, the most relevant content within the displayed content is highlighted on screen. According to at least one embodiment, the portion of the displayed content identified previously at 210 is highlighted by communicating with the presentation software, (e.g., via an appropriate API call) and thereafter the presentation may respond to the communication from the contextual highlighting process 200 by highlighting the displayed content portion. Highlighting may include any combination of visual or other alterations to the displayed content to distinguish the portion of displayed content. For example, highlighting may include applying a colored background to text, font style changes (such as from Times New Roman to Calibri), font size changes, font color changes, bolding, italicizing, underlining, static or animated arrows pointing to the relevant content, and so on.

In embodiments that search previous slides for relevant content as described above at 210, highlighting the relevant content may include communicating with the presentation software to go back in the slide deck to display the correct past slide which contains the relevant content and apply the highlighting to the relevant content. As such, the relevant content is both displayed on screen and highlighted in real-time during the discussion despite the relevant content being on a different slide from the one initially displayed at the time the discussion started.

Figure 3B:
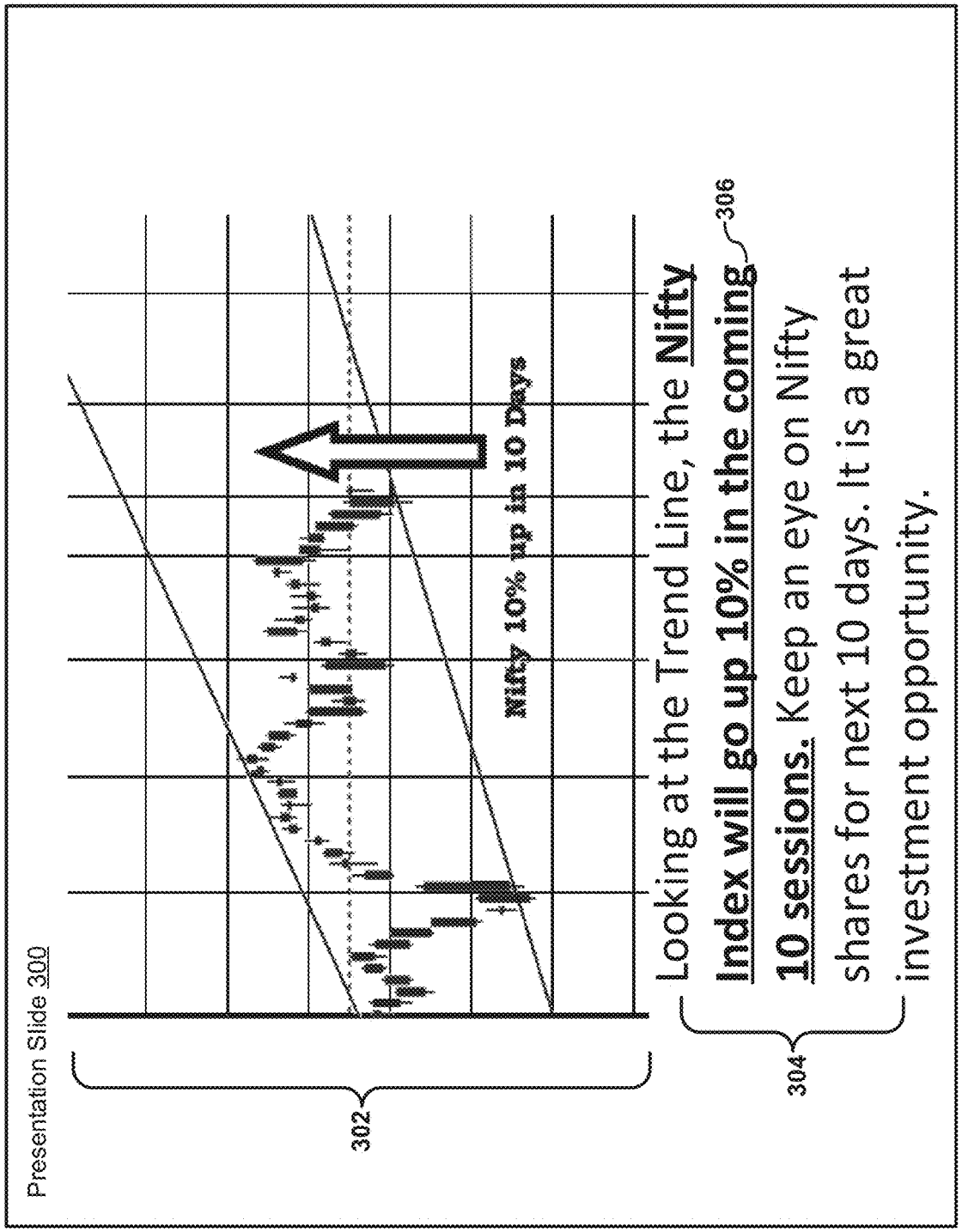

Continuing the previous example, and as depicted in FIG. 3B, the clause "Nifty Index will go up 10% in the coming 10 sessions" was determined to be the most relevant portion 306 of the displayed content. Thereafter, the contextual highlighting process 200 requests, via an API call, that the presentation software highlight the relevant portion 306 which is the clause "Nifty Index will go up 10% in the coming 10 sessions." As shown in FIG. 3B, according to this example, the identified relevant portion 306 is highlighted by applying bold and underline to the text of the relevant portion 306.

At 214, the contextual highlighting process 200 determines if the discussion of the topic is continuing. In embodiments, the discussion between the two or more parties in the meeting or presentation may continue to be analyzed after applying highlighting to the relevant portion 306 of the displayed content as described above at 212. The contextual highlighting process 200 may determine if the discussion between two or more parties continues by monitoring and analyzing the discussion as described above previously at 206. In embodiments, the topic of discussion may be identified in the manner described previously at 208 and the topic compared with the topic determined previously at 208 to determine if the same topic is continuing to be discussed. In addition to, or alternatively, the current discussion topic may be compared to the semantics of the relevant portion 306 to determine if the discussion is still closely related to the highlighted relevant portion 306.

In some embodiments, the contextual highlighting process 200 may also determine if the discussion includes indications that one or more of the parties is expressing doubts or questions regarding the validity of the relevant portion 306. Various NLP techniques used in a supervised machine learning model may be employed to determine if doubts or questions are raised with respect to the relevant portion 306 by, for example, identifying predetermined words or phrases, analyzing tone of voice, monitoring facial expression or body language of a participant via a camera, and so on.

Continuing the previous example, after highlighting the relevant portion 306, another participant P2 states that "Company R's value would not change enough to cause the Nifty Index to increase 10% in 10 days." Based on the analysis of the discussion, the topic of discussion remains related to the increase of the Nifty Index over the next 10 days. Moreover, participant P2 has expressed doubts regarding the points raised in the discussion and the corresponding content highlighted in the relevant portion 306 which are identified by NLP analysis of P2's statement.

If the contextual highlighting process 200 determines that the discussion has moved on to a different topic, or according to some embodiments, no discussion regarding the validity of the topic is identified at 214 then the contextual highlighting process 200 returns to 204 to analyze the discussion.

However, if the contextual highlighting process 200 determines that the discussion has continued on the same topic, or according to some embodiments, if the contextual highlighting process 200 also determined that disagreement regarding the validity of the topic are identified at 214, then the validity of the relevant content 306 is verified at 216. According to at least one embodiment, the contextual highlighting process 200 may utilize a separate service or program to verify the validity of content. For instance, the contextual highlighting process 200 may transmit (e.g., via communication network 116) the content (e.g., the relevant content 306) to be verified to a validation service which may, in some implementations, search the Internet, other knowledge base, or some other information sources to determine the validity of the relevant content 306 the contextual highlighting process 200 transmitted. In response to the contextual highlighting process 200 verification request, the validation service may return a validity score indicating the determined validity of the relevant content 306. Thereafter, the contextual highlighting process 200 may compare the validity score to a predetermined threshold to determine if the relevant content 306 is valid or not valid. In other embodiments, the validity service may make the determination of validity and then transmit a response to the contextual highlighting process 200 indicating the relevant content 306 is valid or not valid.

Continuing the previous example, the contextual highlighting process 200 transmits the relevant content 306 clause stating "Nifty Index will go up 10% in the coming 10 sessions" to a validation service which determines that based on the current trends, there is sufficient confidence the relevant content 306 is valid to return a result of "valid" to the contextual highlighting process 200.

Then, at 218, a validity indicator is added adjacent to the relevant content 306. In embodiments, the contextual highlighting process 200 may communicate with the presentation software (e.g., via an API call) to request a validity indicator be added to the displayed content (e.g., presentation slide 300). The contextual highlighting process 200 may provide the appropriate indicator that is then placed on the slide by the presentation software. In other embodiments, the presentation software may place its own indicator in response to the contextual highlighting process 200 request together with the validity result (i.e., valid or not valid). The validity indicator may take various forms of static, animated, audio, or other indications. For example, the indicator may be a thumbs up (valid) or thumbs down (not valid), an "x" (not valid) or checkmark (valid), and the like. In other embodiments, alternatively or in addition to the indicators described above, the highlighted relevant content 306 may be further altered to indicate validity. For example, if the relevant content is verified as valid, the text of the relevant content 306 may be changed from black in color to green. Thereafter, the contextual highlighting process 200 returns to step 204 to continue analyzing the discussion.

Figure 3C:
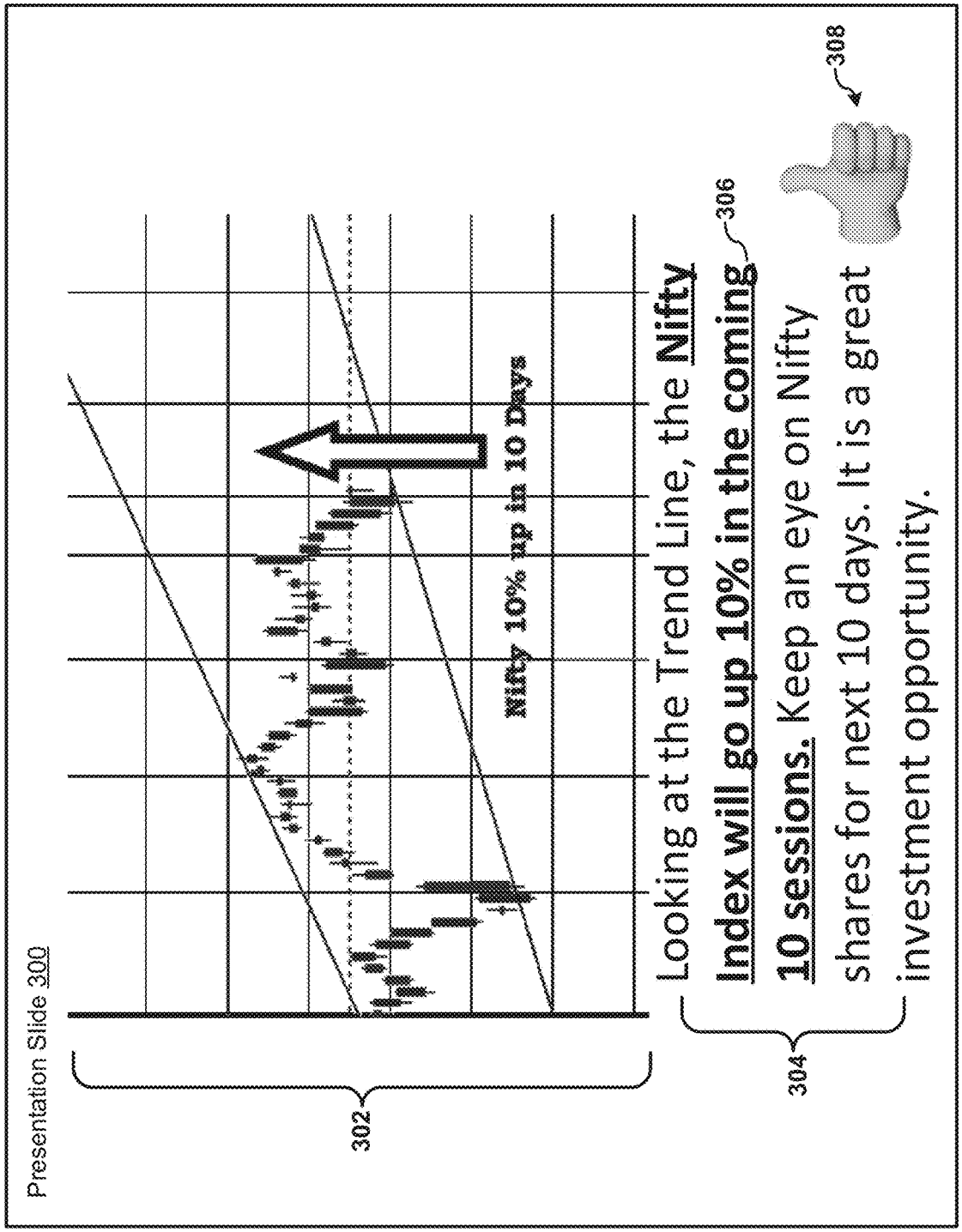

Continuing the previous example, and with reference to FIG. 3C, the relevant content 306 was verified as valid. Thereafter, the contextual highlighting process 200 communicates with the presentation software requesting that a validity indicator that indicates the relevant content 306 is valid be added to the presentation slide 300. The presentation software then adds a thumbs up validity indicator 308 adjacent to the relevant content 306 as depicted to indicate that the relevant content 306 is valid.

It may be appreciated that FIGS. 2 and 3A-C provide only an illustration of one embodiment and do not imply any limitations with regard to how different embodiments may be implemented. Many modifications to the depicted embodiment(s) may be made based on design and implementation requirements. For example, according to alternative embodiments the contextual highlighting process 200 may be integrated into the presentation software or the meeting software, thus communications may be internalized within the software. This integration may, in some embodiments, be accomplished by implementing the contextual highlighting process 200 as a plugin to the presentation or meeting software. In some embodiments, the presentation and meeting software may be combined into a single application that implements the contextual highlighting process 200.

As described in embodiments above, the contextual highlighting program 110a and 110b may improve the functionality of a computer or other technology by providing content highlighting in real-time to content displayed on shared screens that relates to the current discussion such that participants may quickly ascertain the relevant portion of the displayed content in view of the current discussion. Moreover, the validity of the content may be determined and indicated in real-time during a discussion to inform the participants of the validity of the highlighted content and resolve tangential discussion quickly thereby allowing the presentation or meeting to proceed without undue delay.

Figure 4:
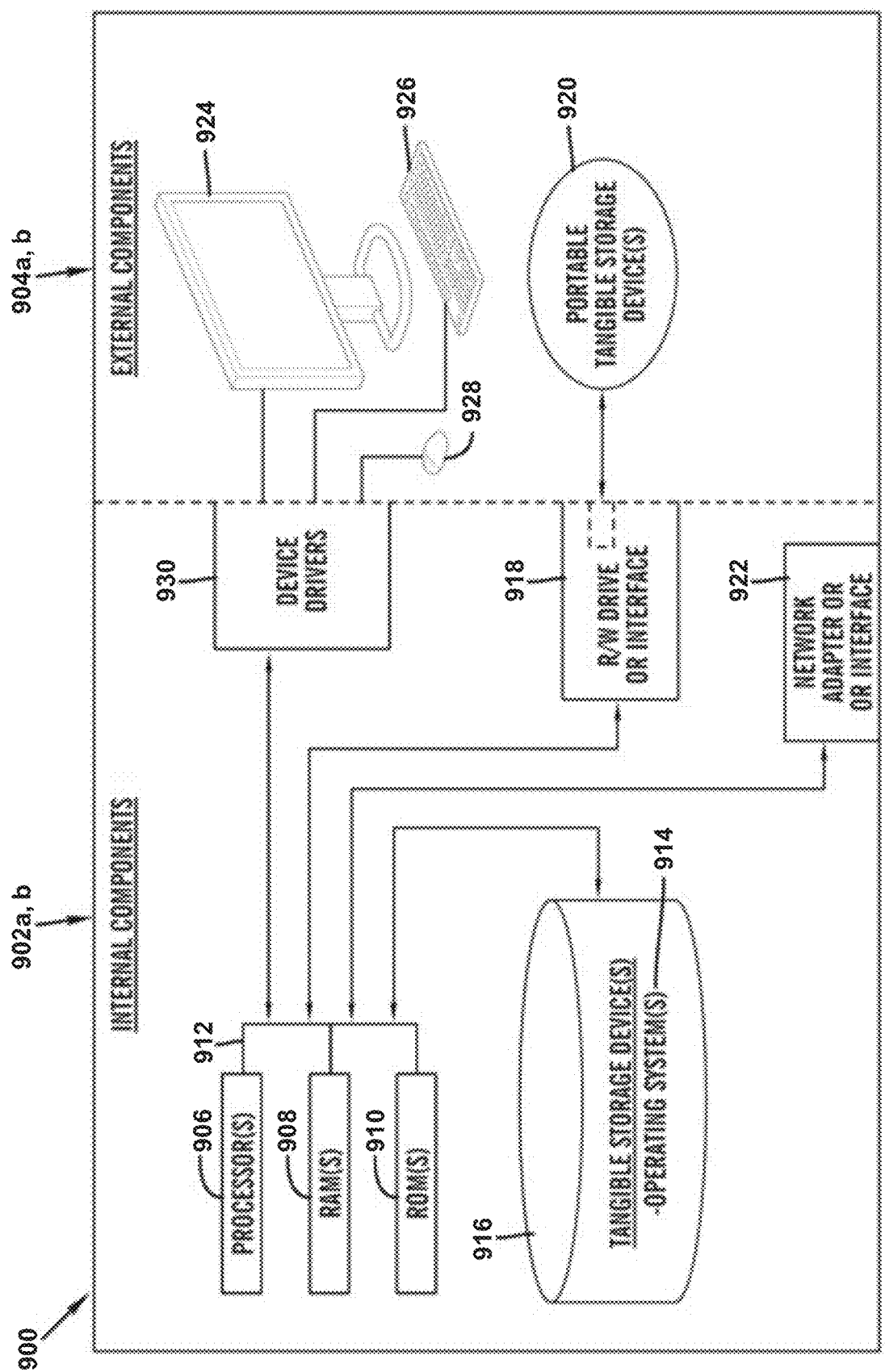
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the contextual highlighting program 110a in client computer 102, and the contextual highlighting program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the contextual highlighting program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the contextual highlighting program 110a in client computer 102 and the contextual highlighting program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the contextual highlighting program 110a in client computer 102 and the contextual highlighting program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
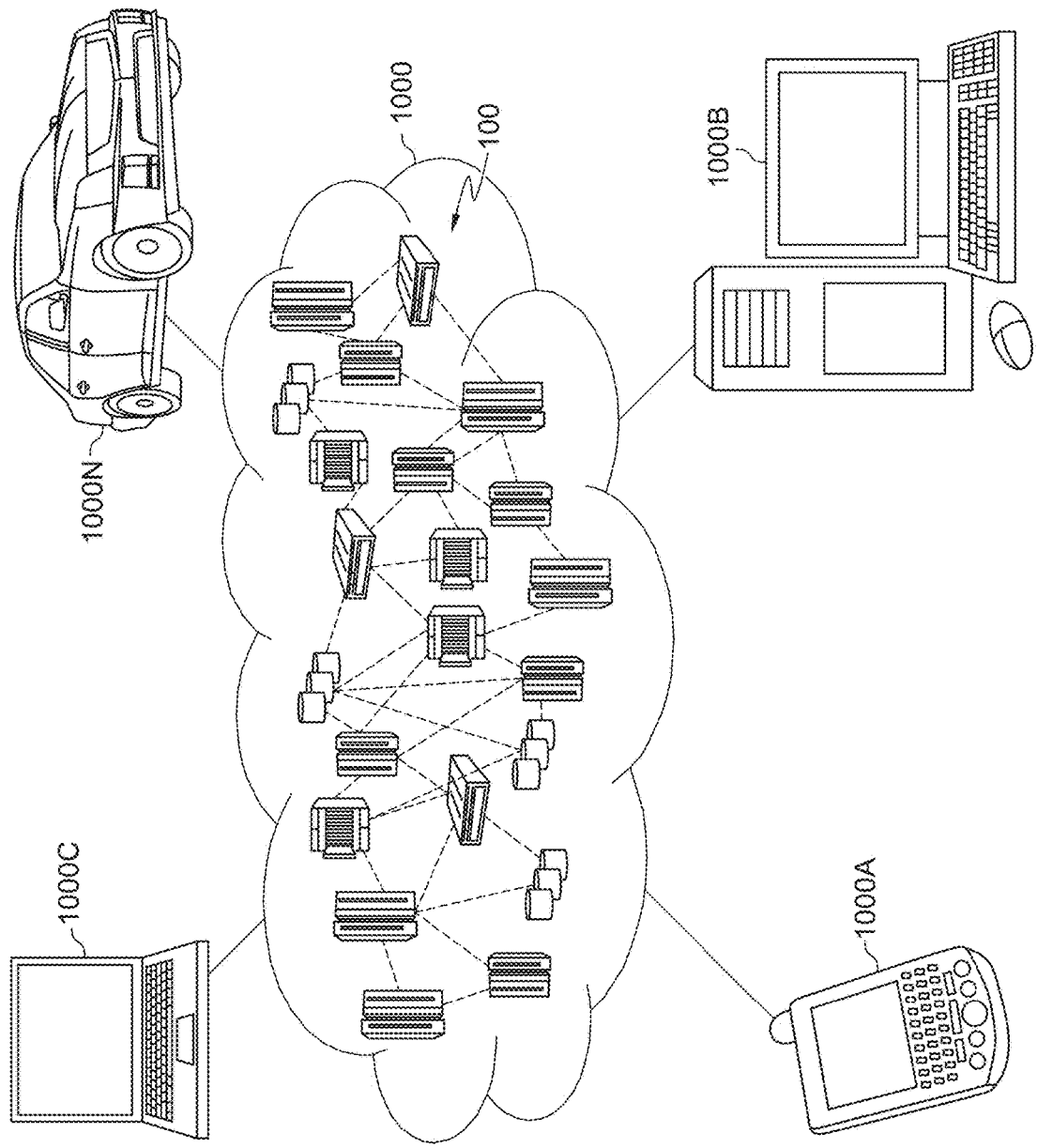
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
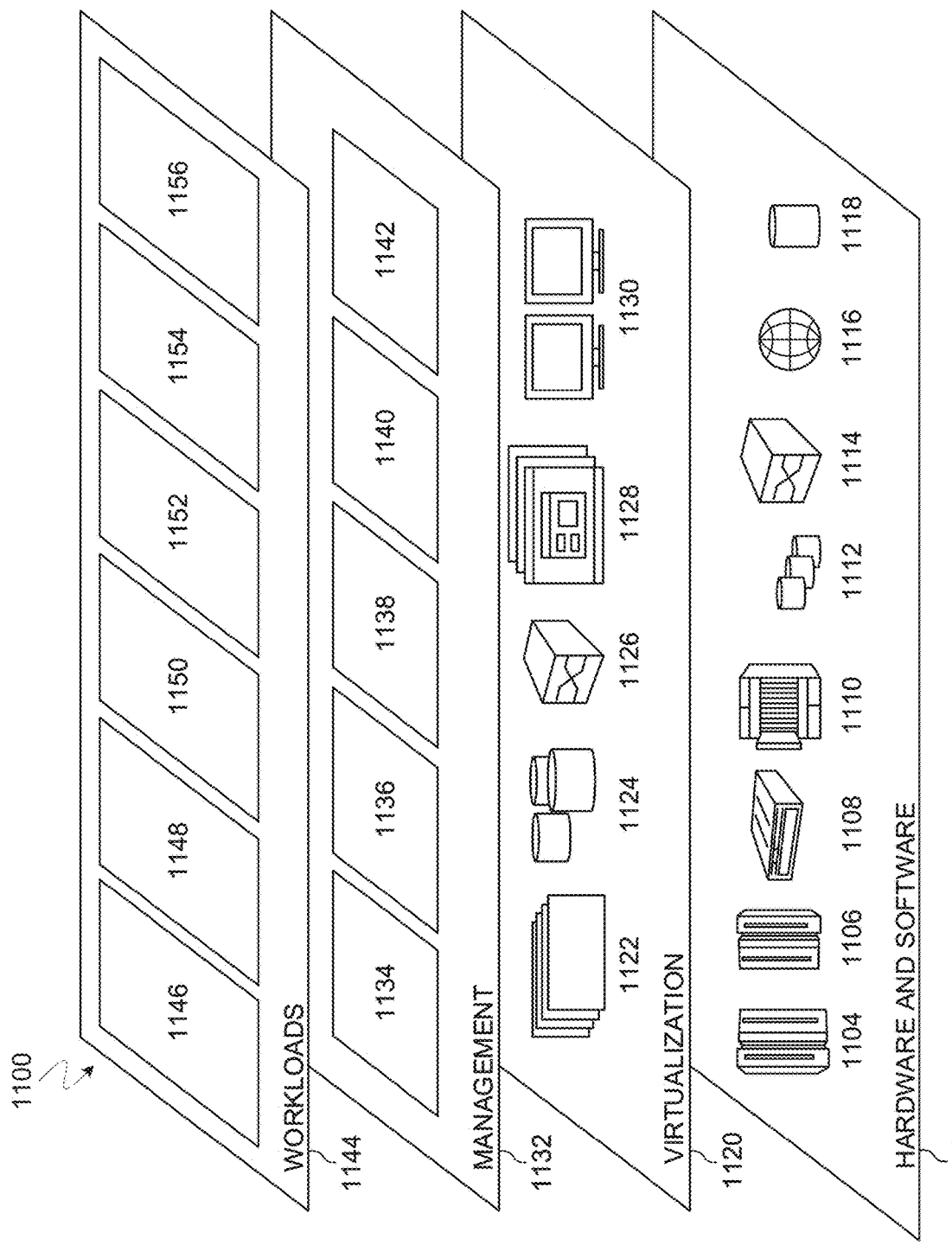
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and contextual highlighting 1156. A contextual highlighting program 110a, 110b provides a way to identify relevant content displayed on a shared screen in real-time based on contextual cues and highlight the relevant content.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for contextual digital content presentation, the method comprising:
    monitoring a real time discussion between a plurality of parties participating in a discussion provided in conjunction with a displayed presentation, wherein said monitoring is being performed by a machine learning device;
    identifying a context of the monitored discussion between one or more participants and their reaction to said monitored discussion, wherein said reaction by said one or more participants are provided verbally or non-verbally;
    analyzing said displayed presentation and verbal or non-verbal reaction of said one or more participants semantically by context, wherein said machine learning device classifies said discussion according to a plurality of discussion topics;
    determining if a new content needs to be displayed by said machine learning device and retrieving said new content;
    identifying a most relevant portion of said presentation and any new content and applying highlighting to it, wherein said new content identified comprises tokenized text;
    generating a similarity score for each portion of said new content identified and selecting a portion of said new content having a highest similarity score relative to a remainder of said new content within a plurality of content portions;
    determining that the monitored discussion is continuing between two or more participants; and
    when said discussion is continuing between two or more participants, determining when at least one participant is disputing at least a part of said presentation including new content and highlighting and search one or more sources for validity of said disputed part and displaying it.

2. The computer-implemented method of claim 1, further comprising:
    determining that the plurality of parties are having the discussion.

3. The computer-implemented method of claim 1, further comprising:
    displaying a validity indicator adjacent to the identified most relevant portion based on the determined validity.

4. The computer-implemented method of claim 1, wherein the applied highlighting is selected from a group consisting of a font size, a font color, a text background color, a font style, a static arrow, and a dynamic arrow.

5. The computer-implemented method of claim 1, wherein identifying the most relevant portion of the displayed content associated with the presentation based on the identified context comprises tokenizing text that is within the displayed content so as to generate a plurality of content portions.

6. The computer-implemented method of claim 5, wherein the displayed content comprises one or more images, wherein image analysis is performed on the one or more images to generate textual image representations describing each of the one or more images in a textual form, and wherein the generated textual image representations are added to the plurality of content portions.

7. A computer system for providing a presentation having contextual digital content highlighting, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

monitoring a real time discussion between a plurality of parties participating in a discussion provided in conjunction with a displayed presentation, wherein said monitoring is being performed by a machine learning device;

identifying a context of the monitored discussion between one or more participants and their reaction to said monitored discussion, wherein said reaction by said one or more participants are provided verbally or non-verbally;

analyzing said displayed presentation and verbal or non-verbal reaction of said one or more participants semantically by context, wherein said machine learning device classifies said discussion according to a plurality of discussion topics;

determining if a new content needs to be displayed by said machine learning device and retrieving said new content;

identifying a most relevant portion of said presentation and any new content and applying highlighting to it, wherein said new content identified comprises tokenizing text;

generating a similarity score for each portion of said new content identified and selecting a portion of said new content having a highest similarity score relative to a remainder of said new content within a plurality of content portions;

determining that the monitored discussion is continuing between two or more participants; and when said discussion is continuing between two or more participants, determining when at least one participant is disputing at least a part of said presentation including new content and highlighting and search one or more sources for validity of said disputed part and displaying it.

8. The computer system of claim 7, further comprising: determining that the plurality of parties are having the discussion.

9. The computer system of claim 7, further comprising: displaying a validity indicator adjacent to the identified most relevant portion based on the determined validity.

10. The computer system of claim 7, wherein the applied highlighting is selected from a group consisting of a font size, a font color, a text background color, a font style, a static arrow, and a dynamic arrow.

11. The computer system of claim 7, wherein identifying the most relevant portion of the displayed content associated with the presentation based on the identified context comprises tokenizing text that is within the displayed content so as to generate a plurality of content portions.

12. The computer system of claim 11, wherein the displayed content comprises one or more images, wherein image analysis is performed on the one or more images to generate textual image representations describing each of the one or more images in a textual form, and wherein the generated textual image representations are added to the plurality of content portions.

13. A computer program product for providing a presentation having contextual digital content highlighting, comprising a computer-readable storage medium having program instructions embodied therewith, the program instructions executable by a processor to cause the processor to perform a method comprising:

monitoring a real time discussion between a plurality of parties participating in a discussion provided in conjunction with a displayed presentation, wherein said monitoring is being performed by a machine learning device;

identifying a context of the monitored discussion between one or more participants and their reaction to said monitored discussion, wherein said reaction by said one or more participants are provided verbally or non-verbally;

analyzing said displayed presentation and verbal or non-verbal reaction of said one or more participants semantically by context, wherein said machine learning device classifies said discussion according to a plurality of discussion topics;

determining if a new content needs to be displayed by said machine learning device and retrieving said new content;

identifying a most relevant portion of said presentation and any new content and applying highlighting to it, wherein said new content identified comprises tokenizing text;

generating a similarity score for each portion of said new content identified and selecting a portion of said new content having a highest similarity score relative to a remainder of said new content within a plurality of content portions;

determining that the monitored discussion is continuing between two or more participants; and when said discussion is continuing between two or more participants, determining when at least one participant is disputing at least a part of said presentation including new content and highlighting and search one or more sources for validity of said disputed part and displaying it.

14. The computer program product of claim 13, further comprising: determining that the plurality of parties are having the discussion.

15. The computer program product of claim 13, further comprising:
displaying a validity indicator adjacent to the identified most relevant portion based on the determined validity.

16. The computer program product of claim 13, wherein the applied highlighting is selected from a group consisting of a font size, a font color, a text background color, a font style, a static arrow, and a dynamic arrow.

17. The computer program product of claim 13, wherein identifying the most relevant portion of the displayed content associated with the presentation based on the identified context comprises tokenizing text that is within the displayed content so as to generate a plurality of content portions.

* * * * *